United States Patent
Wei et al.

(10) Patent No.: US 9,000,098 B2
(45) Date of Patent: Apr. 7, 2015

(54) METHOD OF FABRICATING HIGHLY CROSS-LINKED POLYMER SPHERES HAVING UNIFORM GRANULAR SIZES

(75) Inventors: Ming-Hsiung Wei, Taoyuan County (TW); Yu-Wei Hou, Tainan (TW); Hui Chen, Taipei (TW); Chun-Lan Tseng, Taoyuan County (TW)

(73) Assignee: Chung-Shan Institute of Science and Technology, Armaments, Bureau, Ministry of National Defense, Taoyuan County (TW)

(*) Notice: Subject to any disclaimer, the term of this patent is extended or adjusted under 35 U.S.C. 154(b) by 465 days.

(21) Appl. No.: 13/470,659

(22) Filed: May 14, 2012

(65) Prior Publication Data
US 2013/0303703 A1    Nov. 14, 2013

(51) Int. Cl.
*C08F 2/20* (2006.01)
*C08F 265/06* (2006.01)

(52) U.S. Cl.
CPC ............... *C08F 2/20* (2013.01); *C08F 265/06* (2013.01); *Y10S 525/902* (2013.01)

(58) Field of Classification Search
CPC .................................. C08F 2/20; C08F 265/06
USPC .......................................... 525/243, 305, 902
See application file for complete search history.

(56) References Cited

U.S. PATENT DOCUMENTS

| | | |
|---|---|---|
| 5,216,096 A | 6/1993 | Hattori et al. |
| 6,228,925 B1 | 5/2001 | Pederson et al. |
| 6,949,601 B1 | 9/2005 | Leth-Olsen et al. |
| 2002/0072565 A1* | 6/2002 | Muranaka et al. ............ 524/832 |
| 2005/0084653 A1* | 4/2005 | Nun et al. ..................... 428/143 |
| 2006/0199892 A1* | 9/2006 | Podszun et al. .............. 524/458 |
| 2010/0301257 A1* | 12/2010 | Modahl et al. ............ 252/62.54 |

* cited by examiner

*Primary Examiner* — Mark Kaucher
(74) *Attorney, Agent, or Firm* — Jackson IPG PLLC

(57) ABSTRACT

Polymer spheres are fabricated. Dispersing polymerization and a two-stage swelling procedure are processed. The polymer spheres fabricated have uniform granular sizes and are highly cross-linking. Thus, the polymer spheres are heat-resistant and solvent-resistant.

17 Claims, 7 Drawing Sheets

Figure 1:
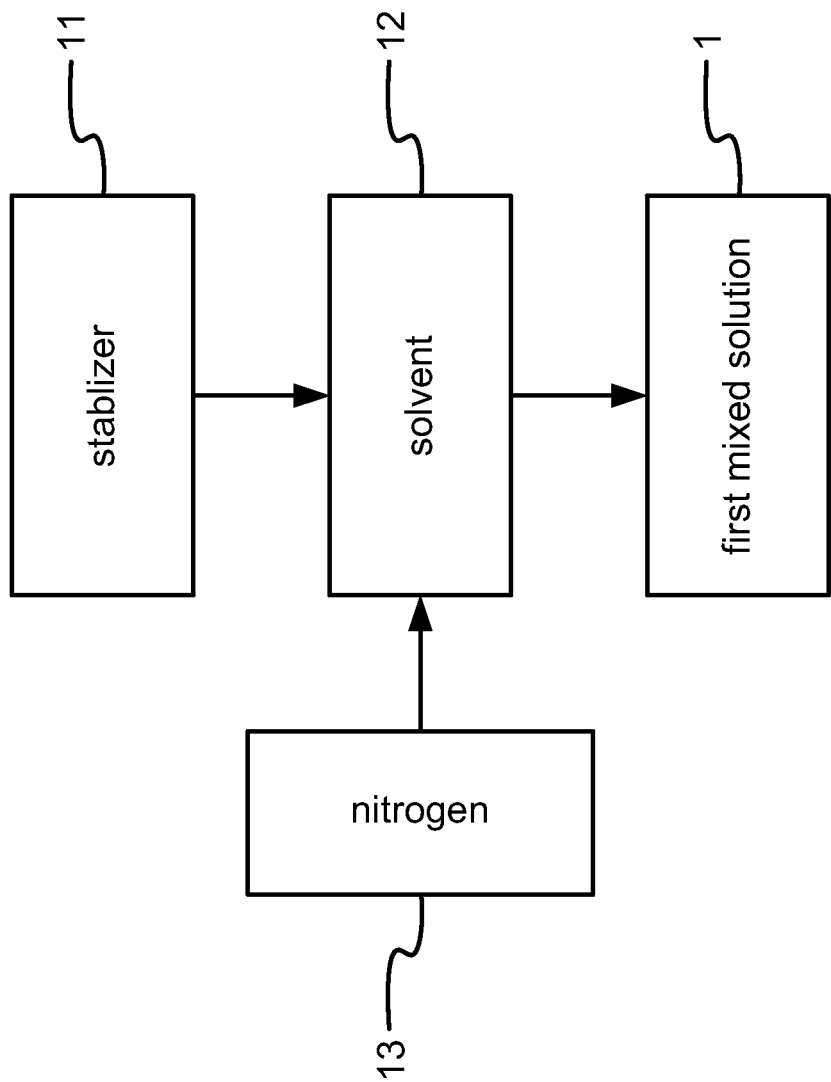

METHOD OF FABRICATING HIGHLY CROSS-LINKED POLYMER SPHERES HAVING UNIFORM GRANULAR SIZES

TECHNICAL FIELD OF THE INVENTION

The present invention relates to fabricating cross-linking polymer spheres; more particularly, relates to fabricating highly cross-linking polymer spheres through dispersion polymerization and two-stage swelling procedure, where the polymer spheres have uniform big granular sizes and are heat-resistant and solvent-resistant.

DESCRIPTION OF THE RELATED ARTS

In general, dispersion polymerization and seed polymerization are used for fabricating polymer spheres having uniform big sizes. In the first stage, dispersion polymerization is used to fabricate seeds having granular sizes of 1-10 micrometers (μm). In the second stage, seed polymerization is used, which can be one-stage swelling or two-stage swelling. The seeds fabricated in the first stage are mainly used for increasing the sizes of the spheres and improving their characteristics, like making them cross-linking and porous.

Dispersion polymerization used in the first stage for fabricating the seeds (e.g. PMMA) is widely used and does not change much until now. Two-stage swelling is preferred for obtaining big-size and highly cross-linking spheres by changing ratio of monomer in a cross-linking agent. However, as referring to patents of U.S. Pat. No. 6,228,925 B1 and U.S. Pat. No. 6,949,601 B1, it is found that, although highly cross-linking and solvent-resistant spheres can be thus fabricated, their sizes are smaller than 5 μm (U.S. Pat. No. 6,228,925 B1). Although uniform spheres having sizes bigger than 10 μm (15 μm) can be fabricated with 0.26 g seeds and 16.4 g monomers, they are not highly cross-linking.

Hence, the prior arts do not fulfill all users' requests on actual use.

SUMMARY OF THE INVENTION

The main purpose of the present invention is to fabricate highly cross-linking polymer spheres, which have big uniform granular sizes and are heat-resistant and solvent-resistant, through dispersion polymerization and two-stage swelling procedure.

To achieve the above purpose, the present invention is a method of fabricating highly cross-linking polymer spheres having uniform granular sizes, comprising steps of: (a) obtaining a plurality of seeds through dispersion polymerization; (b) mixing a content of a swelling assistant and a content of a surfactant to be added with the plurality of seeds for obtaining a seed solution; (c) uniformly mixing a content of a monomer and a content of an initiator to be added with a content of a cross-linking agent and a content of a surfactant for obtaining a monomer emulsion after homogenization; and (d) mixing the seed solution and the monomer emulsion to be stirred and added with a stabilizer and an inhibitor after processing monomer swelling; then, flowing in nitrogen and processing stirring to uniformly process mixing; and, then, heating up rapidly to process polymerization for obtaining a plurality of highly cross-linking polymer spheres. Accordingly, a novel method of fabricating highly cross-linking polymer spheres having uniform granular sizes is obtained.

BRIEF DESCRIPTIONS OF THE DRAWINGS

Figure 3:
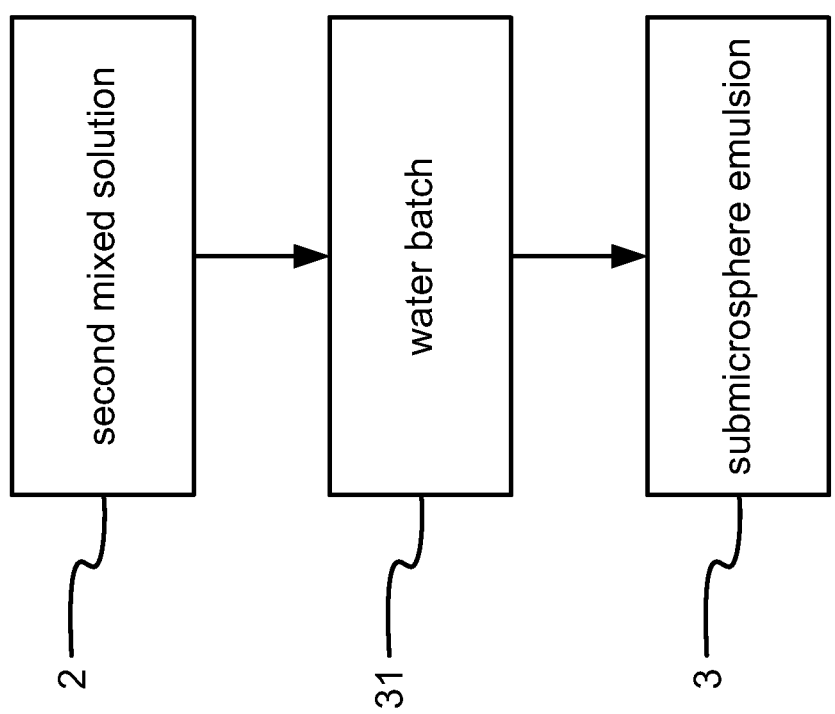
Figure 4:
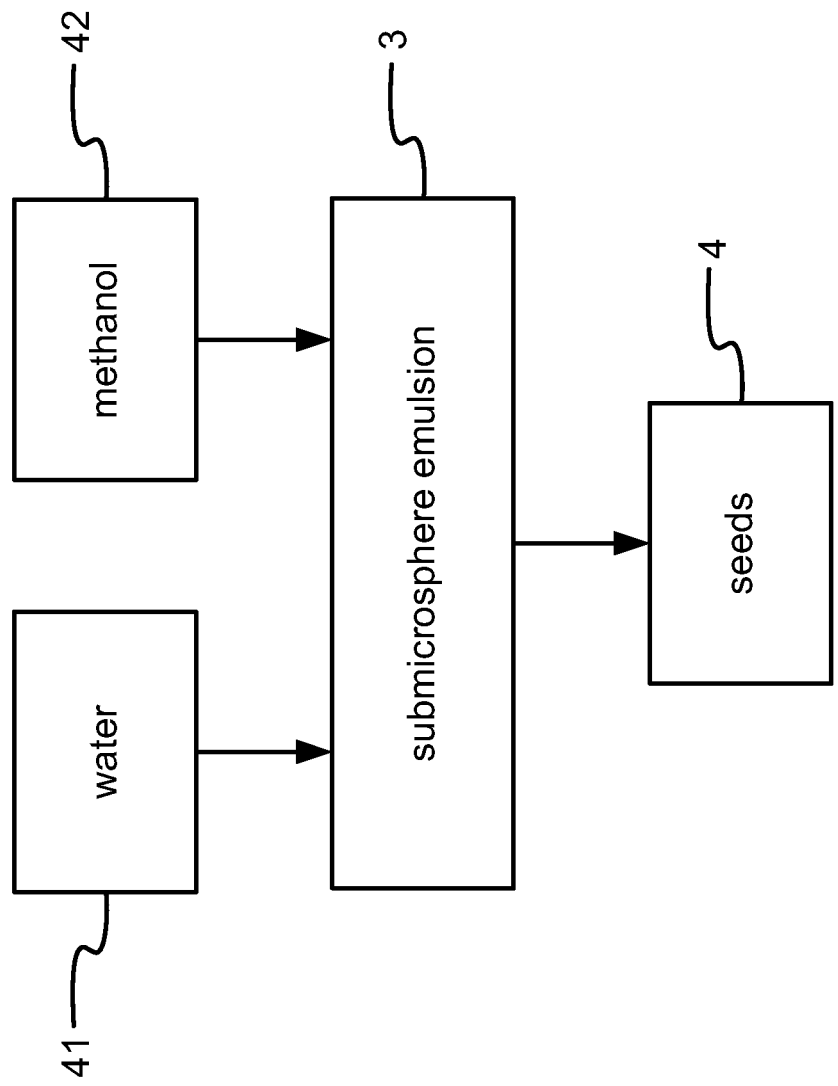
Figure 5:
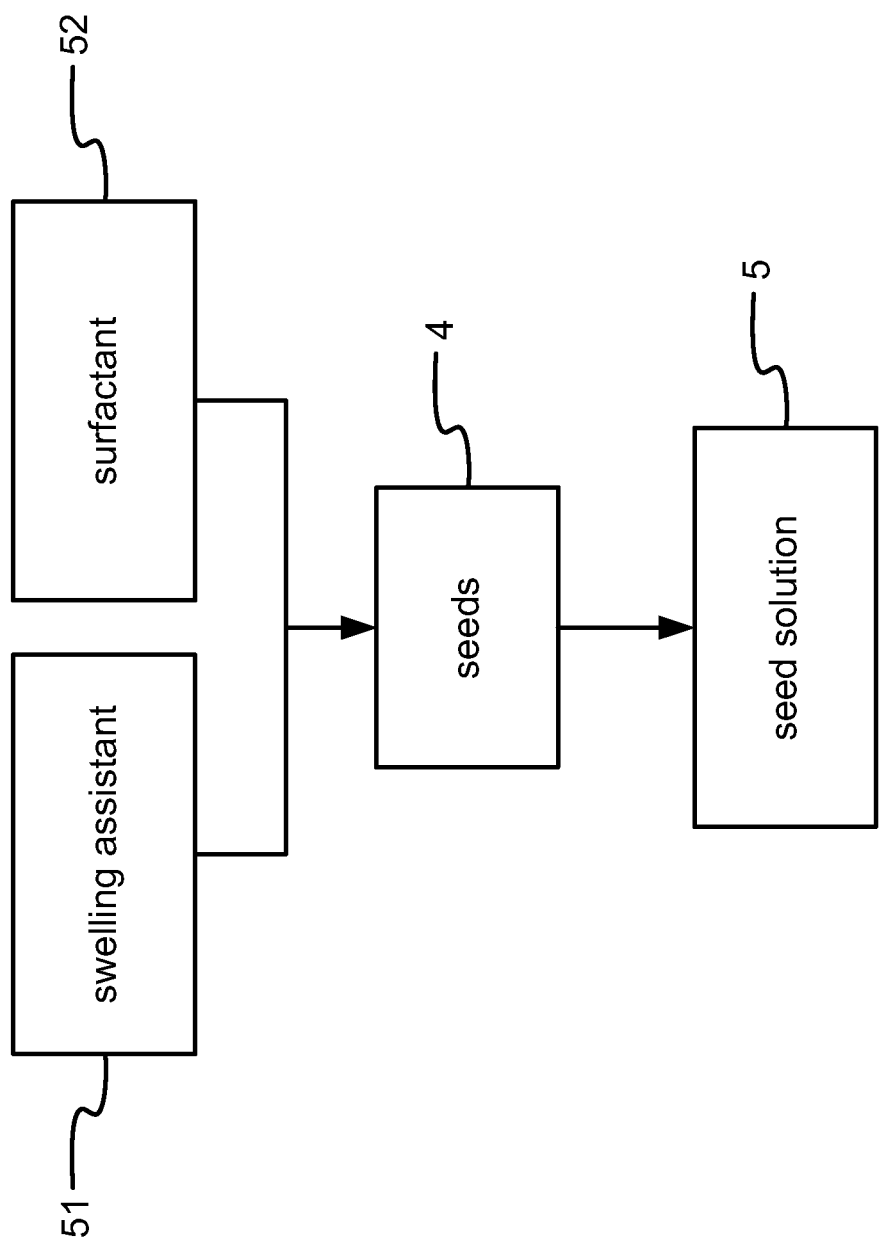
Figure 6:
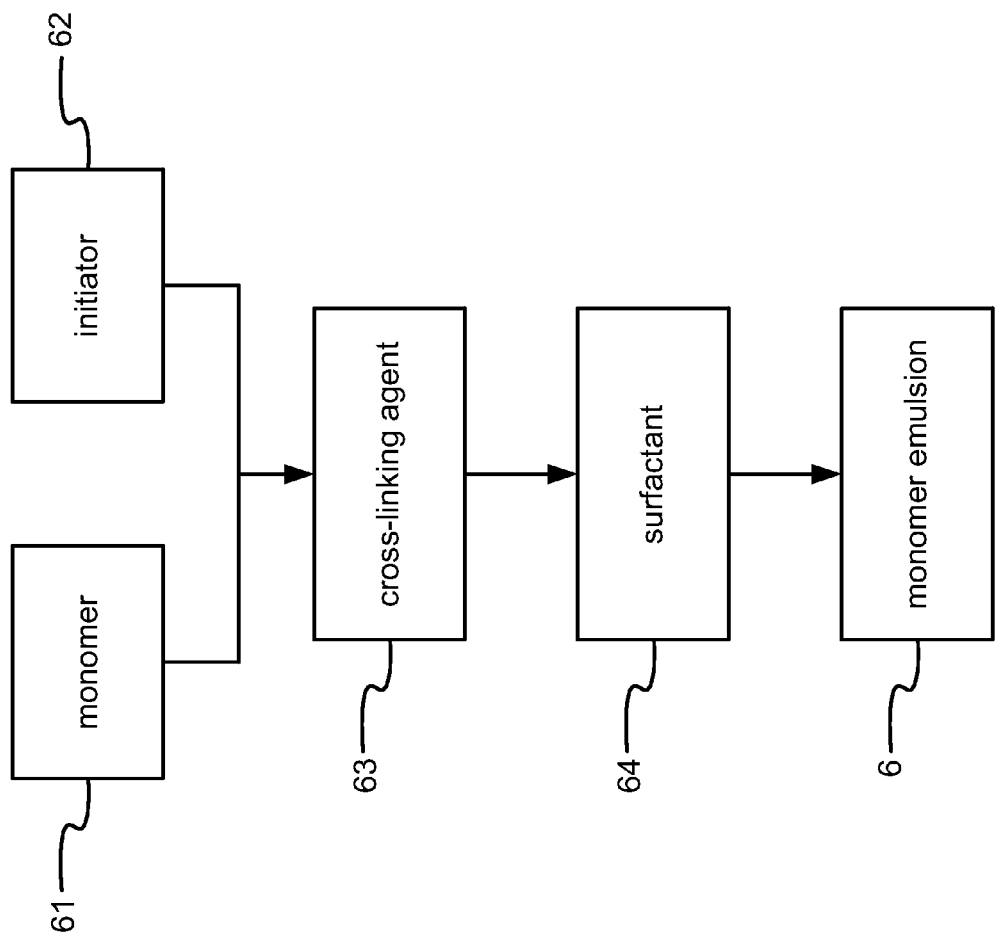
Figure 7:
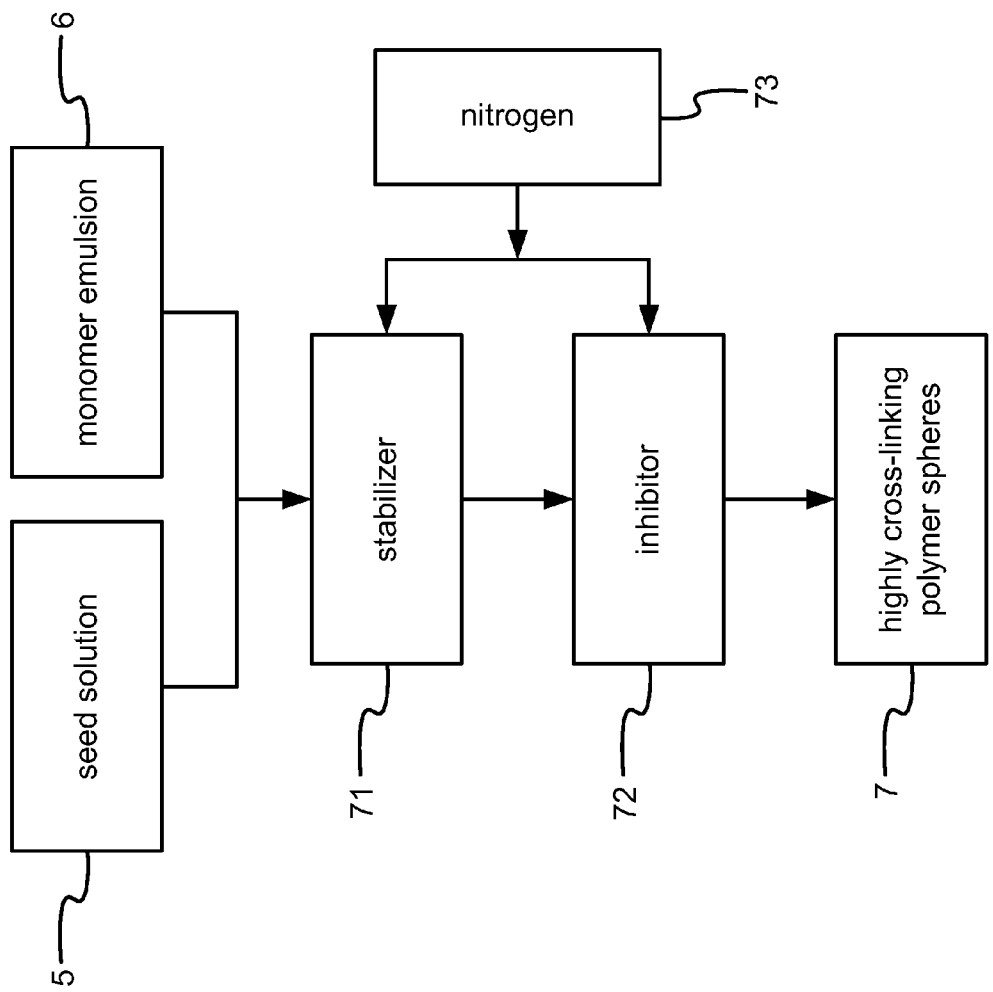

The present invention will be better understood from the following detailed description of the preferred embodiment according to the present invention, taken in conjunction with the accompanying drawings, in which FIG. 1 to FIG. 4 are the views showing step (a) of the preferred embodiment according to the present invention; and FIG. 5 to FIG. 7 are the views showing step (b) to step (d) of the preferred embodiment.

DESCRIPTION OF THE PREFERRED EMBODIMENT

The following description of the preferred embodiment is provided to understand the features and the structures of the present invention.

Figure 2:
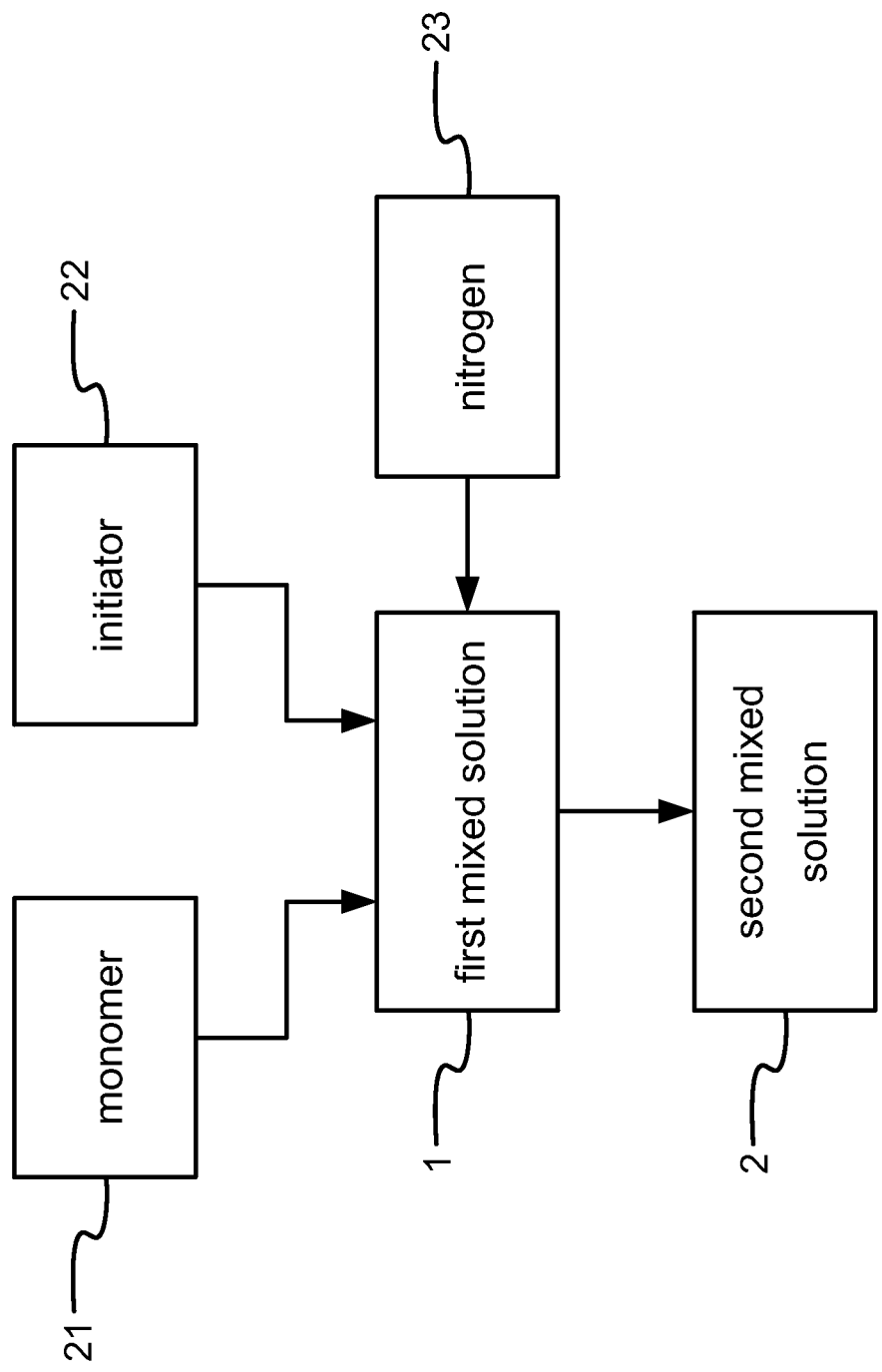

Please refer to FIG. 1 to FIG. 7, which are views showing step (a) of a preferred embodiment according to the present invention; and views showing step (b) to step (d) of the preferred embodiment. As shown in the figures, the present invention is a method of fabricating highly cross-linking polymer spheres having uniform granular sizes, comprising the following steps:

(a) As shown in FIG. 1, a stabilizer 11 is added into a solvent 12 to be stirred with magnetite and, then, nitrogen 13 is flown in to form a first mixed solution 1. Therein, the stabilizer is polyvinylpyrrolidone (PVP), which has a dose of 1 g to be added into the solvent 12; the solvent 12 is a deionized water added with different ratios of water to methanol between 100:0~75:25, where 80:20 is a preferred ratio; and, nitrogen 13 is flown in for 25 minutes (min) to obtain the first mixed solution 1. As shown in FIG. 2, the first mixed solution 1 is added with a monomer 21 and an initiator 22 and then nitrogen 23 is flown in to form a second mixed solution 2. Therein, the monomer 21 is methyl methacrylate (MMA) having a dose of 10 g to be added into the first mixed solution 1; and, the initiator 23 is azobisisobutyronitrile (AIBN) having a dose of 0.1 g to be added into the first mixed solution 1. As shown in FIG. 3, the second mixed solution 2 is put in a water batch 31 with nitrogen 23 flown in for 5 min for processing reaction to obtain a submicrosphere emulsion 3 having a uniform granular size. Therein, the second mixed solution 2 is put in the water batch 31 for reaction for 24 hours (hrs). Then, as shown in FIG. 4, the submicrosphere emulsion 3 is processed through repeated centrifugal washing with water 41 and methanol 42 for removing leftover monomer 21 and stabilizer 22 and further forming a plurality of seeds 4. The procedure in step (a) is a dispersion polymerization.

(b) As shown in FIG. 5, a swelling assistant 51 is mixed with a surfactant 52 to be added with the plurality of seeds 4 for forming a seed solution 5 by stirring. Therein, the swelling assistant 51 is cyclohexane; the surfactant 52 is sodium dodecyl sulfate (SDS) having a concentration of 0.25 percents (%) and a dose of 40 grams (g); the plurality of seeds 4 has a dose of 0.1 g; and, the swelling assistant 51, the surfactant 52 and the plurality of seeds 4 are stirred with magnetite for 30 min through ultra-sonic vibration and, then, are stirred by a mechanical stirrer at a speed of 140 rounds per minute (rpm) for 10 hrs.

(c) As shown in FIG. 6, a content of a monomer 61 and a content of an initiator 62 are mixed uniformly to be added with a content of a cross-linking agent 63 and a content of a surfactant 64 for obtaining a monomer emulsion 6 after homogenization. Therein, the monomer 61 is methyl methacrylate (MMA); the initiator 62 is benzoyl peroxide (BPO); the cross-linking agent 63 is ethylene glycol dimethacrylate (EGDMA) having a content of 20%; the surfactant 64 is sodium dodecyl sulfate (SDS) having a concentration of 0.25% and a dose of 100 g; and, the monomer 61, the initiator 62, the cross-linking agent 63 and the surfactant 64 are homogenized with a homogenizer at a high speed for 10 min and are uniformly dispersed with an ultra-sonic shaker for 10 mim for forming the monomer emulsion 6.

(d) As shown in FIG. 7, the seed solution 5 is mixed with the monomer emulsion 6 to be processed through monomer swelling and then stirred; after the stirring, a stabilizer 71 and an inhibitor 72 are added to be stirred uniformly with nitrogen 73 flown in; and, then, the temperature is rapidly increased to 70 Celsius degrees (° C.) for processing polymerization for 10 min to form highly cross-linking polymer spheres 7. Step (b) to step (d) are a procedure of swelling. In step (d), monomer swelling is processed under 30° C.; then, a mechanical stirrer is used for stirring at a speed of 140 rpm for 6 hrs for mixing the seed solution 5 and the monomer emulsion 6. Therein, the stabilizer 71 is polyvinyl alcohol (PVA) having a concentration of 5%; the inhibitor 72 is sodium nitrite ($NaNO_2$); and, the mechanical stirrer is used for stirring at the speed of 140 rpm for 30 min with nitrogen 73 flown in.

Thus, submicrospheres having granular sizes between 3.5 micrometers (μm) and 10.2 μm are fabricated with a certain content of a solvent 12 and a certain content of monomer 21 in step (a). Then, a second stage of synthesis is processed according to the granular sizes and a flowing speed for a solution of water and methanol having a ratio of 80:20, where the granular sizes are about 5.2 μm with a coefficient of sphere size distribution ($C_v$) of 5.9%.

In step (b) to step (d), when the content of the swelling assistant 51 is too much or too less, small spheres are easily formed, where a preferred content is between 0.1 g and 0.2 g for obtaining spheres having uniform sizes. When a swelling ratio for the monomer is 10 times or 20 times, the granular size is not increased obviously. But, when the swelling ratio for the monomer 61 reaches 100 times, spheres (e.g. MMA spheres) having granular sizes bigger than 10 μm are obtained. Because some monomer 41 is not swelled into the seeds 4 in water phase, the present invention inhibits reaction in water phase by adding the inhibitor 72 for avoiding new nuclei formed from the monomer 61. By increasing the content of the inhibitor 72 to more than 0.1 g, generation of new nuclei is effectively inhibited and microspheres having uniform granular sizes are further obtained. Although the granular sizes can be greatly increased by adding the cross-linking agent 63, the $C_v$ value is increased too. The present invention reduces the content of the monomer 61 to 5-6 g for obtaining uniform polymer spheres (MMA/EGDMA) having a cross-linking ratio of 20%, where the spheres are solvent-resistant and are obviously much more improved in heat resistance than the seeds 4 or spheres without adding cross-linking agent.

Uniformity of the highly cross-linking polymer spheres 7 is judged by their $C_v$ values, where a value smaller than 8% indicates uniform granular sizes. A difference between a number-average diameter ($D_n$) and a volume-average diameter ($D_v$) can be used for the judgment too, where a smaller difference means polymer spheres more uniformed. Besides, standard deviation (σ) can be used for estimating distribution of granular sizes. In a normal distribution, 68% of the spheres will be distributed within 1 standard deviation of an average distance; 95%, within 2 standard deviations; and, 99%, within 3 standard deviations. Related formulas and definitions are as follows:

$$D_n = (\Sigma D_i / n)$$

$$D_v = (\Sigma D_i^3 / n)^{1/3}$$

$$\sigma = (\Sigma (D_i - D_n)^2 / n)^{1/2}$$

$$C_v = (\sigma / D_n) \times 100$$

Therein, '$D_i$' is the granular size of a sphere and n' is the number of the spheres.

[Fabricating Seeds of Submicrospheres]

Dispersion polymerization is processed for fabricating seeds of submicrosphere having uniform granular sizes, where MMA is chosen to be the monomer for fabricating the submicrospheres. An initiator (AIBN) and a stabilizer (PVP) in a certain ratio are added by using different ratios of solutions (methanol:water) with different contents of the monomer (MMA) for fabricating the uniform submicrospheres. When the ratio of water in a specific solution (methanol:water) is higher, the granular sizes of the submicrospheres become smaller yet is well uniformed. This is because MMA is hydrophilic. When the water content is increased, the time for nucleation is shortened and molecules critical chain length is also become short. Thus, the number of nuclei is increased, where spheres of the monomer is uniformly distributed with small granular sizes. As a result, granular sizes are more uniformed with shorter time for nucleation.

As shown in Table 1, by changing the ratio of the solvent through dispersion polymerization, the fabricated microspheres have granular sizes ranged from 3.5 to 10.2 μm. When the content of water is less than 10%, $C_v$ becomes higher than 8%, which means that the microspheres fabricated under a water content higher than 10% are uniform in size. Hence, the present invention uses a solution of methanol and water under a ration of 80:20 for a synthesis in the second stage, where the fabricated microspheres have granular sizes near 5.2 μm and $C_v$ values near 5.4%.

TABLE 1

| methanol:water | 100:0 | 95:5 | 90:10 | 85:15 | 80:20 | 75:25 |
|---|---|---|---|---|---|---|
| $D_n$(um) | 9.7 | 10.3 | 9.4 | 5.5 | 5.2 | 3.4 |
| $C_v$ % | 8.3 | 8.5 | 7.7 | 6.4 | 5.4 | 3.6 |
| standard deviation | 0.8 | 0.87 | 0.72 | 0.35 | 0.28 | 0.12 |

As shown in Table 2, when the content of monomer is increased from 10% to 15%, there are no big change in the granular sizes, except some small spheres are generated. When the content of monomer is increased to 15%, $C_v$ value is increased from 5.4% to 15.7%. When the content of monomer is increased to 20%, the granular sizes are obviously increased from 5.2 μm to 7.47 μm along with more small spheres generated. The generation of the small spheres indicates that, when the content of the monomer is increased, a second nucleation stage may easily appear. When the monomer content is increased, solubility of the monomer is increased in water phase, the time for nucleation is increased and molecules critical chain length is increased too. Hence, the granular sizes of the microspheres are further become bigger. Moreover, because of the longer time for nucleation, the second nucleation stage may easily appear. It is because, when the nuclei grow to a certain size, the stabilizer would chemically or physically adhere on surfaces of the nuclei. As a result, the monomer can not be easily dispersed into stable nuclei and new nuclei are thus formed. This is the second nucleation stage which forms non-uniform granular sizes. Since the increase in monomer content can help growing spheres having bigger size yet affect uniformity of the sphere in size, the monomer used in the present invention has a preferred content of 10%.

TABLE 2

| monomer content | (a) 10% | (b) 15% | (c) 20% |
|---|---|---|---|
| $D_n$(um) | 5.2 | 5.14 | 7.47 |
| $C_v$% | 5.4 | 15.7 | 29.5 |
| standard deviation | 0.28 | 0.8 | 2.2 |

[Fabricating Highly Cross-Linking Microspheres Through Two-Stage Swelling]

As shown in Table 3, although microspheres having uniform granular sizes can be easily fabricated through dispersion polymerization, the cross-linking agent is hard to be used in dispersion polymerization for obtaining highly cross-linking and solvent-resistant microspheres, which are the target production for the present invention. In one hand, the existence of the cross-linking agent may destroy mechanism of dispersion polymerization and growth of new nuclei. In another hand, as MMA is used, the solvent system has to be of methanol and the reaction temperature has to be at 55° C. If the temperature is not high enough, the cross-linking stability will become bad and the spheres thus generated will not be good enough for solvent-resistance. Hence, the present invention uses a procedure of two-stage swelling. The present invention uses a monomer having a content of 10% along with a solvent having a ration of MeOH:H$_2$O=8:2 to fabricate seeds for obtaining a seed solution for the second-stage swelling.

TABLE 3

| Cyclohexane content(g) | 0.05 | 0.1 | 0.2 | 0.3 |
|---|---|---|---|---|
| Average size (μm) | 11.34 | 10.9 | 10.72 | 9.8 |
| $C_v$% | 18.5 | 6.1 | 5.4 | 20.4 |
| Standard deviation | 2.39 | 0.66 | 0.58 | 3.97 |

The procedure of two-stage swelling comprises a sub-swelling and a main swelling. The sub-swelling introduces a compound which has a small molecular weight and is more hydrophobic than the monomer to active the seeds. Through the sub-swelling, speed and level for the spheres on absorbing the monomer are increased, which is done in the main swelling. The swelling assistant used in the present invention is cyclohexane, which has a molecular weight of 84.16 g/mol and a solubility of 8.2 (cal/cm$^3$)$^{1/2}$. The seeds used in the present invention are PMMA seeds, which have a solubility of 9.24 (cal/cm$^3$)$^{1/2}$. Difference between the solubility of the above two materials is about 1, which is acceptable in a swelling system. When the content of cyclohexane is 0.05 g, the granular size is the biggest yet with a few small spheres; and distribution of granular sizes is in a wide range. It may be because that the insufficient content of the sub-swelling agent makes seeds absorb different amounts of cyclohexane. When the content of cyclohexane is changed to 0.1 g and 0.2 g, saturated concentrations of the PMMA spheres for absorbing cyclohexane are between 0.1 g and 0.2 g, where 0.2 g of cyclohexane is preferred. When the cyclohexane content is increased to 0.3 g, a great amount of small spheres are generated and the distribution of the granular sizes is wider than that for 0.05 g of cyclohexane. When the content of cyclohexane is increased to a degree of amount more than what can be absorbed by the seeds, the leftover cyclohexane existed in the system will hinder the process of the main swelling and compete with the spheres for the monomer. Thus, new nuclei will be generated while affecting monodispersity of the spheres.

As shown in Table 4, when the content of MMA monomer is 1 g or 2 g, the granular size is 5.58 μm or 5.69 μm. As comparing to the seed size of 5.2 μm, the size does not grow much bigger. It may be because that, when the polymerization is processed at 70° C., the solubility of MMA is about 1.6 g/100 g. For a solution of 220 g, more than 3.5 g of MMA is stably dissolved in water phase at 70° C. without being dispersed into the seeds. Hence, when 1 g or 2 g of the monomer is added, most of the monomer is stably dissolved in water phase and the granular sizes are increased only a little bit. When the content of monomer is increased to 10 g, the granular sizes are about 11.7 μm and are uniform. When the content of monomer is increased, the $C_v$ value is increased as well but is still below 8%, which shows that uniform spheres are formed. Hence, the present invention uses a monomer having a weight of 10 g, a granular size of 11.7 μm and a $C_v$ value of 5.8%, preferably.

TABLE 4

| MMA content (g) | 1 | 2 | 5 | 10 |
|---|---|---|---|---|
| Average size (μm) | 5.58 | 5.69 | 6.23 | 11.7 |
| $C_v$% | 4 | 3.5 | 4.2 | 5.8 |
| Standard deviation | 0.227 | 0.216 | 0.258 | 0.71 |

As shown in Table 5, since the MMA monomer will be partially dissolved in water phase, the present invention adds the inhibitor (NaNO$_2$) to inhibit reaction of the monomer in water phase for avoiding self-polymerization of the monomer into new spheres. When the inhibitor is added with 0.01 g or 0.05 g, a great amount of small spheres are generated along with big $C_v$ value, which shows too little inhibitor does not inhibit the monomer polymerization in water phase. Hence, the content of inhibitor is increased to 0.1 g and 0.2 g with almost no small spheres found and the $C_v$ values are all below 8%, which shows uniform granular sizes are obtained. The inhibitor added in the present invention has a weight of 0.2 g, a granular size of 11.7 μm and a $C_v$ value of 5.8%, preferably.

TABLE 5

| NaNO$_2$ content (g) | 0.01 | 0.05 | 0.1 | 0.2 |
|---|---|---|---|---|
| Average size (μm) | 11.09 | 10.64 | 11 | 11.7 |
| $C_v$% | 20.7 | 23.7 | 7.1 | 5.8 |
| Standard deviation | 2.3 | 2.52 | 0.78 | 0.71 |

As shown in Table 6 and Table 7, when the content of the cross-linking agent is increased from 0% to 20%, the granular sizes are increased from 11.7 μm to 15.5 μm and the $C_v$ value is increased from 5.8 to 19.4. It is because that, on processing the swelling, the mechanism mainly depends on the difference between hydrophilicity and hydrophobicity. The cross-linking agent, EGDMA, is more hydrophobic than the monomer, MMA. Hence, the cross-linking agent is easier to be dispersed into the seeds and makes the seeds absorb more monomer than those without adding the cross-linking agent for thus forming bigger spheres. Following the adding of the cross-linking agent, the $C_v$ value is increased too. There are two reasons. One is that, under the same conditions, by adding a more hydrophobic cross-linking agent, the original swelling system for the monomer is destroyed, where distribution of swelling coefficients is not uniform and makes the granular sizes not uniform. The other one is that, because the reaction of the cross-linking agent is faster than the monomer, the leftover monomer is hard to be dispersed into the seeds in the polymerization once the cross-linking agent finishes its reaction and forms a structure having a high cross-linking density. As a result, the leftover monomer in water phase is easily formed into non-uniform spheres. When the content of the cross-linking agent is increased to 20%, 30% and 40%, the granular sizes are a little reduced. The reason is as mentioned that, when the monomer content is increased, granular sizes may become non-uniform and extra small spheres may be generated. Hence, on averaging the granular sizes, more small spheres make the average granular size smaller. The $C_v$ value of the spheres are very close but the granular sizes are not uniform. However, a higher content of cross-linking agent makes the fabrication of microsphere harder. 20% of cross-linking agent is enough for the spheres to become solvent-resistant. Hence, the present invention uses 20% of cross-linking agent for fabricating uniform spheres. With 10 g of the monomer and 20% of the cross-linking agent, the fabricated spheres have a granular size of 15.5 μm and a $C_v$ value of 19.4%, yet their uniformity is very bad. Therefore, the present invention tries to reduce the monomer content to solve the problem of non-uniform granular sizes, where the sizes will be reduced at the same time as expected. Yet, since the spheres fabricated by using 10 g of monomer and 20% of cross-linking agent will have granular sizes much bigger than 10 μm, the present invention reduces the content of the monomer for solving the non-uniformity problem for the granular sizes yet remaining the granular size bigger than 10 μm. As shown in Table 7, when the content of the monomer is reduced to 8 g, 7 g, 6 g and 5 g, the $C_v$ value is reduced as well. By reducing the monomer content, the present invention controls and further finds a saturated value for the swelling system. When the content of the monomer is reduced to 8 g and 7 g, a few small spheres are still generated and the $C_v$ value is still higher than 8%. When the content of the monomer is reduced from 7 g to 6 g, the $C_v$ value is reduced from 13.4% to 4.7% with a granular size remained at 10.8 μm. This granular size is twice as big as the seed and is almost the same size to that of the spheres fabricated by using 5 g of the monomer. However, because the granular size of the spheres fabricated by using 6 g of the monomer is bigger, the present invention uses 6 g of the monomer and 20% of the cross-linking agent.

TABLE 6

| EGDMA content | 0% | 20% | 30% | 40% |
|---|---|---|---|---|
| Average size (μm) | 11.7 | 15.52 | 14.46 | 14.34 |
| $C_v$ % | 5.8 | 19.4 | 19.7 | 20.2 |
| Standard deviation | 0.67 | 3 | 2.84 | 2.89 |

TABLE 7

| Monomer content | 5 g | 6 g | 7 g | 8 g |
|---|---|---|---|---|
| Average size (μm) | 10.2 | 10.87 | 11.75 | 12.53 |
| $C_v$% | 4.6 | 4.7 | 13.2 | 15.5 |
| Standard deviation | 0.47 | 0.51 | 1.55 | 1.94 |

With 0.1 g of seeds, 0.2 g of swelling assistant (cyclohexane), 6 g of monomer (MMA+EGDMA 20%), 0.6 g of initiator (BPO) and 0.2 g of inhibitor ($NaNO_2$), polymer spheres are fabricated. After being dried through centrifugation, 10% of solid content of the spheres are sunk in THF for 24 hrs in a room temperature and, then, SEM is used for acquiring their granular sizes. As shown in Table 8, after the spheres with 0% cross-linking agent is sunk in THF, their shapes are remained with a swelling ratio of 102%, which is proved to be solvent-resistant.

TABLE 8

| cross-linking agent content | 0% | 20% |
|---|---|---|
| Average size before THF | 11.7 μm | 10.87 μm |
| Average size after THF | — | 11.09 μm |
| Swellability | Soluble | 102% |

By using a thermogravimetry analyzer (TGA), weight losses of organisms owing to increased temperature can be figured out; and, by analyzing the weight losses, heat resistance and pyrolysis of materials can be figured out. As shown in Table 9, the biggest weight loss of the seeds (a) is appeared at 308° C., and 0% cross-linking spheres (b) are appeared at 311° C. Hence, without adding cross-linking agent, the temperature for the biggest weight loss is not increased, which means heat resistance is not improved. In the other hand, the 20% cross-linking spheres (c) has a biggest weight loss at 340° C., which means heat resistance of the spheres is obviously improved.

TABLE 9

| | (a) Seed | (b) 0% cross-linking | (c) 20% cross-linking |
|---|---|---|---|
| temperature for biggest weight loss (° C.) | 311 | 308 | 340 |

To sum up, the present invention is a method of fabricating highly cross-linking polymer spheres having uniform granular sizes, where highly cross-linking polymer spheres are fabricated through dispersion polymerization and two-stage swelling procedure and the polymer spheres have uniform big granular sizes and are heat-resistant and solvent-resistant.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:
1. A method of fabricating cross-linked polymer spheres having uniform granular sizes, comprising the steps of:
 (a) obtaining a plurality of seeds through dispersion polymerization;
 (b) mixing a content of a swelling assistant and a content of a surfactant to be added with said plurality of seeds to obtain a seed solution, wherein said swelling assistant, said surfactant and said plurality of seeds are mixed through ultra-sonic vibration with magnetite for 30~40 minutes (min) and, then, are stirred with a mechanical stirrer at a speed of 120~160 rounds per minute (rpm) under a temperature of 25~35 Celsius degrees (° C.) for a time period of 8~12 hours (hr);
 (c) uniformly mixing a content of a monomer and a content of an initiator to be added with a content of a cross-linking agent and a content of a surfactant to obtain a monomer emulsion after homogenization; and
 (d) mixing said seed solution and said monomer emulsion to be stirred and added with a stabilizer and an inhibitor after processing monomer swelling; then, flowing in nitrogen and stirring to uniformly process mixing; and, then, heating up to process polymerization to obtain a plurality of cross-linked polymer spheres, wherein said spheres have an average granular diameter twice as big as that of said seeds.

2. The method according to claim 1, wherein, in step (a), on obtaining said plurality of seeds, a stabilizer is added into a solvent, stirred with magnetite and purged with nitrogen to obtain a first mixed solution; then, said first mixed solution is added with a monomer and an initiator, and purged with nitrogen to obtain a second mixed solution; then, said second mixed solution is put in a water batch to obtain an emulsion having uniform submicrospheres; and, then, said emulsion is processed through repeated centrifugal washing with water and methanol to obtain said plurality of seeds after removing leftover monomers and stabilizer.

3. The method according to claim 1, wherein step (b) to (d) are a two-stage swelling procedure.

4. The method according to claim 1, wherein, in step (b), said swelling assistant is cyclohexane.

5. The method according to claim 1, wherein, in step (b), said surfactant is sodium dodecyl sulfate (SDS) having a concentration of 0.25 percents (wt %) and a dose of 40~60 grams (g).

6. The method according to claim 1, wherein, in step (b), said plurality of seed has a dose of 0.1~0.2 g.

7. The method according to claim 1, wherein, in step (c), said monomer is methyl methacrylate (MMA).

8. The method according to claim 1, wherein, in step (c), said initiator is benzoyl peroxide (BPO).

9. The method according to claim 1, wherein, in step (c), said cross-linking agent is ethylene glycol dimethacrylate (EGDMA) and is added at a concentration of 15~25 wt %.

10. The method according to claim 1, wherein, in step (c), said surfactant is sodium dodecyl sulfate (SDS) having a concentration of 0.25 wt % and a dose of 90~120 g.

11. The method according to claim 1, wherein, in step (d), said monomer swelling is processed at a temperature of 25~40° C. and, then, is stirred with a mechanical stirrer at a speed of 120~160 rpm for 5~8 hrs to mix said seed solution and said monomer emulsion.

12. The method according to claim 1, wherein, in step (d), said stabilizer is polyvinyl alcohol (PVA) having a concentration of 4~6 wt %.

13. The method according to claim 1, wherein, in step (d), said inhibitor is sodium nitrite ($NaNO_2$) having a dose of 0.1~0.2 g.

14. The method according to claim 1, wherein, in step (d), after flowing in nitrogen, a mechanical stirrer is used to process uniform mixing by stirring at a speed of 120~160 rpm for 25~40 min.

15. The method according to claim 1, wherein, in step (d), after increasing temperature to 65~80° C., said polymerization is processed for 9~12 hrs to obtain said plurality of polymer spheres having an average granular diameter twice as big as that of said seeds.

16. The method of claim 1, wherein the diameter of said spheres is between about 5.1 and about 5.2 µm.

17. A method of fabricating cross-linked polymer spheres having uniform granular sizes, comprising the steps of:
(a) obtaining a plurality of seeds through dispersion polymerization;
(b) mixing a content of a swelling assistant and a content of a surfactant to be added with said plurality of seeds to obtain a seed solution;
(c) uniformly mixing a content of a monomer and a content of an initiator to be added with a content of a cross-linking agent and a content of a surfactant to obtain a monomer emulsion after homogenization, wherein said monomer, said initiator, said cross-linking agent and said surfactant are homogenized at a speed of about 8000 to about 12,000 rpm for 10~20 min and, then, are uniformly dispersed with a ultra-sonic shaker for 10~20 min to obtain said monomer emulsion;
(d) mixing said seed solution and said monomer emulsion to be stirred and added with a stabilizer and an inhibitor after processing monomer swelling; then, flowing in nitrogen and stirring to uniformly process mixing; and, then, heating up to process polymerization to obtain a plurality of cross-linking polymer spheres, wherein said spheres have an average granular diameter twice as big as that of said seeds.

\* \* \* \* \*